United States Patent
Theobald et al.

(10) Patent No.: US 9,912,765 B2
(45) Date of Patent: Mar. 6, 2018

(54) NETWORK SYSTEM AND METHOD FOR PROVIDING LOCATION TARGETED CONTENT TO A MOBILE COMPUTING DEVICE

(71) Applicant: KILTR LIMITED, Glasgow (GB)

(72) Inventors: Oliver Theobald, Glasgow (GB); Stewart Fraser, Glasgow (GB); Brian Hughes, Glasgow (GB); Alastair Murdoch, Glasgow (GB)

(73) Assignee: KILTR LIMITED, Glasgow (GB)

(*) Notice: Subject to any disclaimer, the term of this patent is extended or adjusted under 35 U.S.C. 154(b) by 0 days.

(21) Appl. No.: 15/303,347

(22) PCT Filed: Apr. 2, 2015

(86) PCT No.: PCT/GB2015/000109
§ 371 (c)(1),
(2) Date: Oct. 11, 2016

(87) PCT Pub. No.: WO2015/155495
PCT Pub. Date: Oct. 15, 2015

(65) Prior Publication Data
US 2017/0034289 A1    Feb. 2, 2017

Related U.S. Application Data

(60) Provisional application No. 61/978,455, filed on Apr. 11, 2014.

(51) Int. Cl.
*H04W 24/00* (2009.01)
*H04L 29/08* (2006.01)
(Continued)

(52) U.S. Cl.
CPC .......... *H04L 67/18* (2013.01); *G06F 17/3087* (2013.01); *G06F 17/30867* (2013.01);
(Continued)

(58) Field of Classification Search
USPC ...................................... 455/456.3
See application file for complete search history.

(56) References Cited

U.S. PATENT DOCUMENTS 7,848,765 B2   12/2010   Phillips et al.
8,720,771 B2    5/2014   MacKinnon Keith
(Continued)

FOREIGN PATENT DOCUMENTS

WO   WO-02/095532 A2   11/2002
WO   WO-2014/077780 A1   5/2014

OTHER PUBLICATIONS

International Search Report and Written Opinion for Application No. PCT/GB2015/000109, dated Jul. 3, 2015.
(Continued)

*Primary Examiner* — Joel Ajayi
(74) *Attorney, Agent, or Firm* — Marshall, Gerstein & Borun LLP; Randall G. Rueth (57) ABSTRACT

A network system for providing content to a mobile computing device of a user based upon the location of the mobile computing device. A wireless internet access point provides access to a single vendor web site such that upon connecting the wireless internet access points to the user's mobile computing device, a processor determines whether the device is associated with a user and if so, said device is directed to the landing page of the vendor web site when the user mobile computing device's device location is within a predetermined proximity to the wireless internet access point of that vendor.

21 Claims, 7 Drawing Sheets (51) Int. Cl.
    *G06F 17/30*     (2006.01)
    *H04M 3/42*     (2006.01)
    *H04W 4/02*     (2018.01)

(52) U.S. Cl.
    CPC ...... *H04L 67/306* (2013.01); *H04M 3/42357* (2013.01); *H04W 4/021* (2013.01)

(56) References Cited

U.S. PATENT DOCUMENTS

| | | |
|---|---|---|
| 2011/0307318 A1 | 12/2011 | LaPorte et al. |
| 2013/0197992 A1 | 8/2013 | Bao |
| 2013/0325577 A1 | 12/2013 | Bonner et al. |
| 2014/0172535 A1 | 6/2014 | Matthews |

OTHER PUBLICATIONS

Wikipedia, "Human Billboard," (2014). Retrieved from the Internet on Jun. 23, 2015: URL: https://en.wikipedia.org/w/index.php?title=human_billboard&ordid=595218384.

Wikipedia, "Geo-fence," (2014). Retrieved from the Internet on Jun. 23, 2015: URL: https://en.wikipedia.org/w/index.php?title=geo-fence&ordid=601035863.

NETWORK SYSTEM AND METHOD FOR PROVIDING LOCATION TARGETED CONTENT TO A MOBILE COMPUTING DEVICE

CROSS-REFERENCE TO RELATED APPLICATIONS

This application is the U.S. national phase of PCT/GB2015/000109, filed Apr. 2, 2015, which claims the benefit of U.S. provisional application No. 61/978,455, filed Apr. 11, 2014, the entire respective disclosures of which are incorporated herein by reference.

The present invention relates to a network system and method for providing location targeted content to a mobile computing device such as, but not limited to a mobile phone, tablet computer or lap top computer. The targeted information may be information which is relevant to the location such as advertising including hyper local advertising, visitor information or the like.

BACKGROUND TO THE INVENTION

The advent of mobile devices with location determination capabilities has resulted in the development of a wide variety of location-based services, including location-based advertising. Vendors with physical locations are interested in driving local traffic through advertising on mobile devices. The combination of location-based services and mobile advertising has enabled vendors to target mobile device users within specified areas.

Location-based advertising is based on the premise that users' locations and their proximity to a place of interest impact the performance of an advertising campaign. Location-based advertising has developed to enable advertisers to analyse campaign performance by individual places of interest across millions of locations to understand precisely where within a location consumers are active and what they are doing.

U.S. Pat. No. 7,848,765 describes methods and systems for providing location based services. A user interface is provided that enables a user of a portable electronic device to define a geofence. The user determines a current location of the portable electronic device using an interactive map on the portable electronic device and the current location is monitored by an application server with respect to the geofence. When the application server determines that the current location of the portable electronic device is within the geofence, instructions are transmitted to the portable electronic device to cause said device to offer a service to the user that is not offered when the user is external to the geofence.

Technology applications of geofencing have focussed upon providing user defined areas where information is provided. Location based services focus upon the collection of consumer information which is concerned with predicting consumer behaviour.

SUMMARY OF THE INVENTION

It is an object of the present invention to provide businesses and other organisations in a locality such as tourist information centres and museums with a platform through which they may provide web-based content to users that is linked very specifically to their location in a cost effective manner. Another object of the invention is to allow easy content editing.

It is another object of the present invention to provide a network system and a computer implemented method for providing location targeted content to a mobile computing device.

In accordance with a first aspect of the invention there is provided a network system for providing content to a mobile computing device of a user based upon the location of the mobile computing device, the system comprising a server having:

a user database for storing personal information about a plurality of users;
a mobile computing device database for storing information which identifies the device and the device location;
a vendor database which stores information on each of the vendors within the network; and
a vendor web site which contains a landing page;
one or more wireless internet access points connected to the server via a communication link;
wherein each of the wireless internet access points provides access to a single vendor web site such that upon connecting the wireless internet access points to the user's mobile computing device, a processor determines whether the mobile computing device is associated with a user and if so, said mobile computing device is directed to the landing page of the vendor web site when the user mobile computing device's device location is within a predetermined proximity to the wireless internet access point of that vendor.

Preferably, the step of directing the mobile computing device to the landing page comprises triggering an event on the mobile computing device which informs the user that they are within the predetermined proximity to the wireless internet access point and presents the mobile computing device with access to the landing page of the vendor website.

Optionally, the step of directing the mobile computing device to the landing page comprises triggering an event on the mobile computing device which informs the user that they are within the predetermined proximity to the wireless internet access point and presents the mobile computing device with access to the landing page a plurality of vendor websites and/or other sources of local content.

Preferably, when a user mobile computing device moves from a location in proximity to a first wireless internet access point to a location in proximity to a second wireless internet access point, where the wireless signals from the first wireless Internet access point and from the second wireless internet access point are both detectable by the mobile computing device, the mobile computing device's internet session provided via the first wireless internet access point is interrupted and redirected to the second wireless internet access point for providing a new internet session via that vendor's landing page.

Preferably, the relative signal strength of the first wireless internet access point and the second wireless internet access point, is used to determine the relative proximity of the mobile computing device to the first wireless internet access point and the second wireless internet access point and to determine which wireless internet access point should provide internet access.

Alternatively, the signal strength of the wireless internet access points is used to detect the presence of all of wireless internet access points in proximity to the mobile computing device and the display of the mobile computing device is presented with information to allow a user to select an appropriate landing page.

Preferably, the landing pages are ranked in accordance with the relative signal strengths from their respective wireless internet access points.

Preferably, the wireless internet access point is provided with a geofence which further defines the area within which it is to provide internet access to a mobile computing device.

Preferably, the Network comprises a plurality of vendors in a geographical location.

Preferably, the network defines a location where specific information is to be displayed on a landing page at a predetermined geographical location via the wireless internet access point provided at the geographical locations.

Preferably, the network comprises a plurality of shops, hotels and other commercial premises located in a geographical location such as a city.

Optionally, the vendors comprise a series of information points at a museum or other tourist attraction.

Preferably, the network is a Wi-Fi network

Preferably, the personal information is created by the user upon registration such as a username and password.

Alternatively, the personal information may be obtained from a user's social media profile. In the former case, the user may provide a more limited amount of information about themselves.

Preferably, a globally unique identifier and a Unique User ID is created and stored in the user database Preferably, a connection between a mobile computing device and a wireless internet access point in the network is recorded in the user device database.

Preferably, the wireless internet access point allows access to the landing page.

Preferably, a MAC address of the wireless Internet access points is stored in the vendor database this provides accurate location coordinates for the wireless internet access point.

Preferably, the MAC address location is cross checked with the mobile computing device GPS location to further determine whether the mobile computing device is in proximity to the wireless internet access point.

Preferably, the vendor database stores information on the physical location of the wireless internet access points.

Preferably, the vendor web page is stored on a central server.

Preferably, the vendor web page is provided with an authoring tool which allows an author to post updates to the web page which is linked to the location of the wireless internet access point and associated web page.

Preferably, the geographical location of the wireless internet access points is stored in the network.

Preferably, the MAC address of the wireless internet access points is stored in the vendor database this provides accurate location coordinates for the wireless internet access point.

Preferably, the physical location of the mobile computing device is detected relative to the wireless internet access points in the network to provide information on the movement of the mobile computing device in the network.

Preferably, the wireless internet access point is a router.

Preferably, the communications link comprises:
a vendor router;
a router cloud device; and
a remote authentication server; wherein
the network system creates an unique ID for the mobile computing device and replicates the unique ID and sends the unique ID to the vendor router and to the router cloud device;
the versions of the unique ID which have been sent to the vendor router and to the router cloud device are then sent to the remote authentication server such that, if when compared they are found to be identical, access to the internet is provided and if they are not identical, the presence of a fault is inferred and the user device is directed to a holding page until the fault has been fixed.

Preferably, the communication link is a network bridge.

In another aspect of the present invention, there is provided a system in which the data associated with a user provides a predictive model of user behaviour built up over time for a user. The predictive model is dependent upon the movement of the user device and its interaction with the system and is independent of the personal information provided by the user when registering to use the system.

In accordance with a second aspect of the invention there is provided a computer implemented method for providing content to a mobile computing device of a user based upon the location of the mobile computing device, the method comprising: Using stored information about a user, the mobile computing device associated with the user, a vendor and a vendor website to provide to the user access to a single vendor web site via a dedicated wireless Internet access point such that upon connecting the wireless internet access points to a user's mobile computing device, a processor determines whether the device is associated with a user and if so, said device is directed to the landing page of the vendor web site when the user mobile computing device's device location is within a predetermined proximity to the wireless internet access point of that vendor.

Preferably, the step of directing the mobile computing device to the landing page comprises triggering an event on the mobile computing device which informs the user that they are within the predetermined proximity to the wireless internet access point and presents the mobile computing device with access to the landing page of the vendor website and/or local information such as, businesses, events and deals.

Preferably, when a user mobile computing device moves from a location in proximity to a first wireless internet access point to a location in proximity to a second wireless Internet access point, where the wireless signals from the first wireless internet access point and from the second wireless internet access point are both detectable by the mobile computing device, the mobile computing device's internet session provided via the first wireless internet access point is interrupted and redirected to the second wireless internet access point for providing a new internet session via that vendor's landing page.

Preferably, the relative signal strength of the first wireless internet access point and the second wireless internet access point, is used to determine the relative proximity of the mobile computing device to the first wireless internet access point and the second wireless internet access point and to determine which wireless internet access point should provide internet access.

Alternatively, the signal strength of the wireless internet access points is used to detect the presence of all of wireless internet access points in proximity to the mobile computing device and the display of the mobile computing device is presented with information to allow a user to select an appropriate landing page.

Preferably, the landing pages are ranked in accordance with the relative signal strengths from their respective wireless internet access points, Preferably, the wireless internet access point is provided with a geofence which further defines the area within which it is to provide internet access to a mobile computing device.

Preferably, the Network comprises a plurality of vendors in a geographical location.

Preferably, the network defines a location where specific information is to be displayed on a landing page at a predetermined geographical location via the wireless internet access point provided at the geographical locations.

Preferably, the network comprises a plurality of shops, hotels and other commercial premises located in a geographical location such as a city.

Optionally, the vendors comprise a series of information points at a museum or other tourist attraction.

Preferably, the network is a Wi-Fi network

Preferably, data relating to a user is provided to the user database from the user's existing social media profile.

Preferably, the user database comprises a user profile.

Preferably, a globally unique identifier and a Unique User ID is created and stored in the user database Preferably, a connection between a mobile computing device and a wireless internet access point in the network is recorded in the user device database.

Preferably, the wireless internet access point allows access to the landing page.

Preferably, a MAC address of the wireless internet access points is stored in the vendor database this provides accurate location coordinates for the wireless internet access point.

Preferably, the MAC address location is cross checked with the mobile computing device GPS location to further determine whether the mobile computing device is in proximity to the wireless internet access point.

Preferably, the vendor database stores information on the physical location of the wireless Internet access points.

Preferably, the vendor web page is stored on a central server.

Preferably, the vendor web page is provided with an authoring tool which allows an author to post updates to the web page which is linked to the location of the wireless internet access point and associated web page.

Preferably, the geographical location of the wireless internet access points is stored in the network.

Preferably, the MAC address of the wireless internet access points is stored in the vendor database this provides accurate location coordinates for the wireless internet access point.

Preferably, the physical location of the mobile computing device is detected relative to the wireless internet access points in the network to provide information on the movement of the mobile computing device in the network.

Preferably, the wireless internet access point is a router.

Preferably, the communication link is a network bridge.

BRIEF DESCRIPTION OF THE DRAWINGS

The present invention will now be described with reference to the accompanying drawings in which.

DETAILED DESCRIPTION OF THE DRAWINGS

The present invention is a hardware and software solution, which has been designed to provide a platform through which a range of content created by members of a network can be offered to users. It allows users who have pre-existing social media profiles to use the existing profile information to easily become users of the network.

Figure 1:
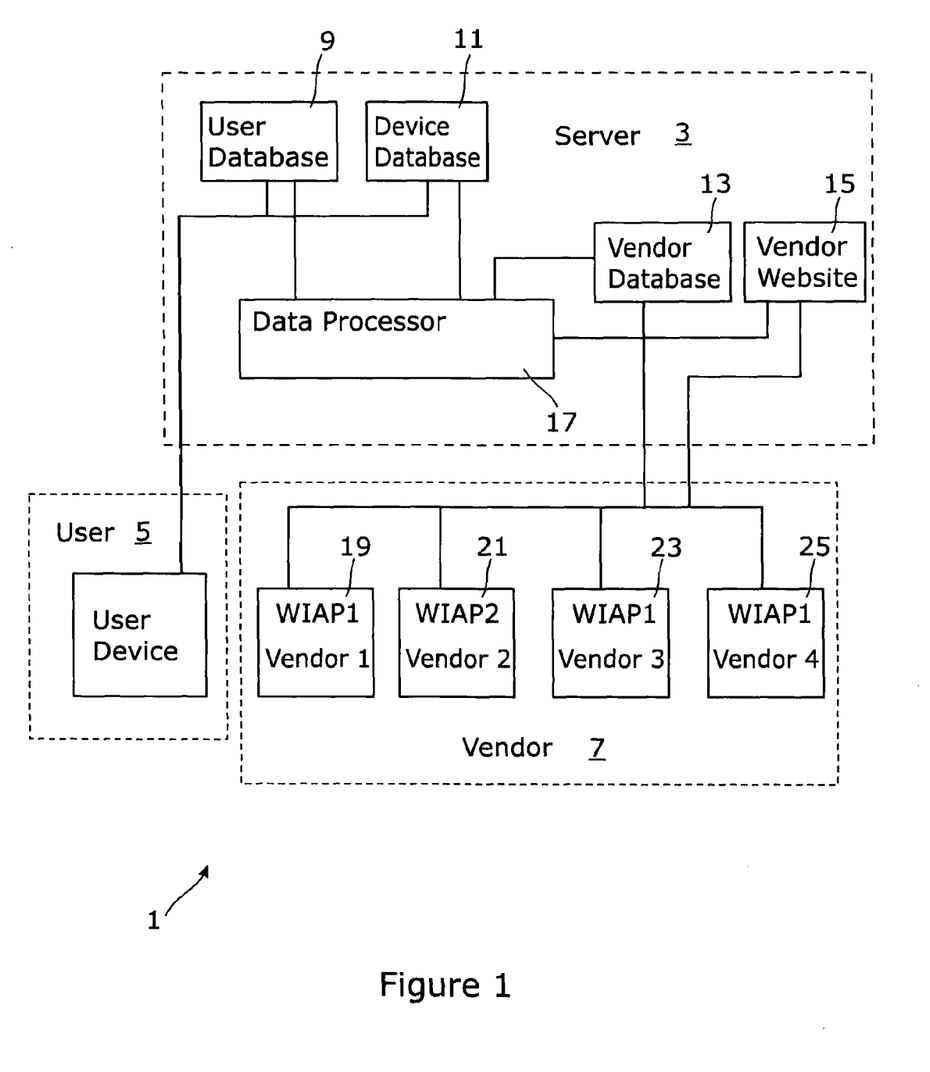
FIG. 1 is a block diagram of an example of a network system in accordance with the present invention.

FIG. 1 is a block diagram of an example of a network system in accordance with the present invention. It shows a network 1 which for the purpose of explaining the functionality of the system, is separated into three elements. The server side 3 comprises the hardware and software which stores and processes data concerning the end user of the system, the mobile device associated with the user and the vendor. This is shown as a user database 9 which stores information relating to the user such as a social media user profile, a device database 11 which stores information on the mobile device such as its MAC address, a vendor database 13 which identifies the vendor's router or wireless internet access point and a vendor website 15 which provides landing page content.

The user side 5 is the mobile computing device owned by or associated with the user through which they wish to obtain internet access via a network system in accordance with the present invention. The device may be any computing device which is able to connect to a wireless internet access point; for practical purposes this is likely to be a mobile device such as a cell phone, tablet computer, portable media player or lap top computer.

The vendor side 7 shows four wireless internet access points WIAP1 19. WIAP2 21 WIAP3 23 and WIAP4 25. Each WIAP is associated with a vendor. Vendors are companies and other organizations which have signed up to the network and may be retail outlets, cafes, restaurants, bars or any other person or organization with an interest in providing free internet access in return for the opportunity to advertise their goods and services on a dedicated landing page. Where the network is provided by a local authority of tourist organization, there may be a number of access points which provide general information to a user and/or provide information on other vendors nearby the wireless internet access point from which the user is obtaining internet access.

The vendors may also be defined as information points at a tourist attraction such as a museum where a user is able to use their mobile computing device to access multimedia content about an exhibit or point of interest when in proximity to that exhibit or point of interest. In this way a user/visitor may have an enhanced experience when visiting the museum without having to use the type of dedicated media device which are commonly provided by museums or tourist attractions.

Figure 2:
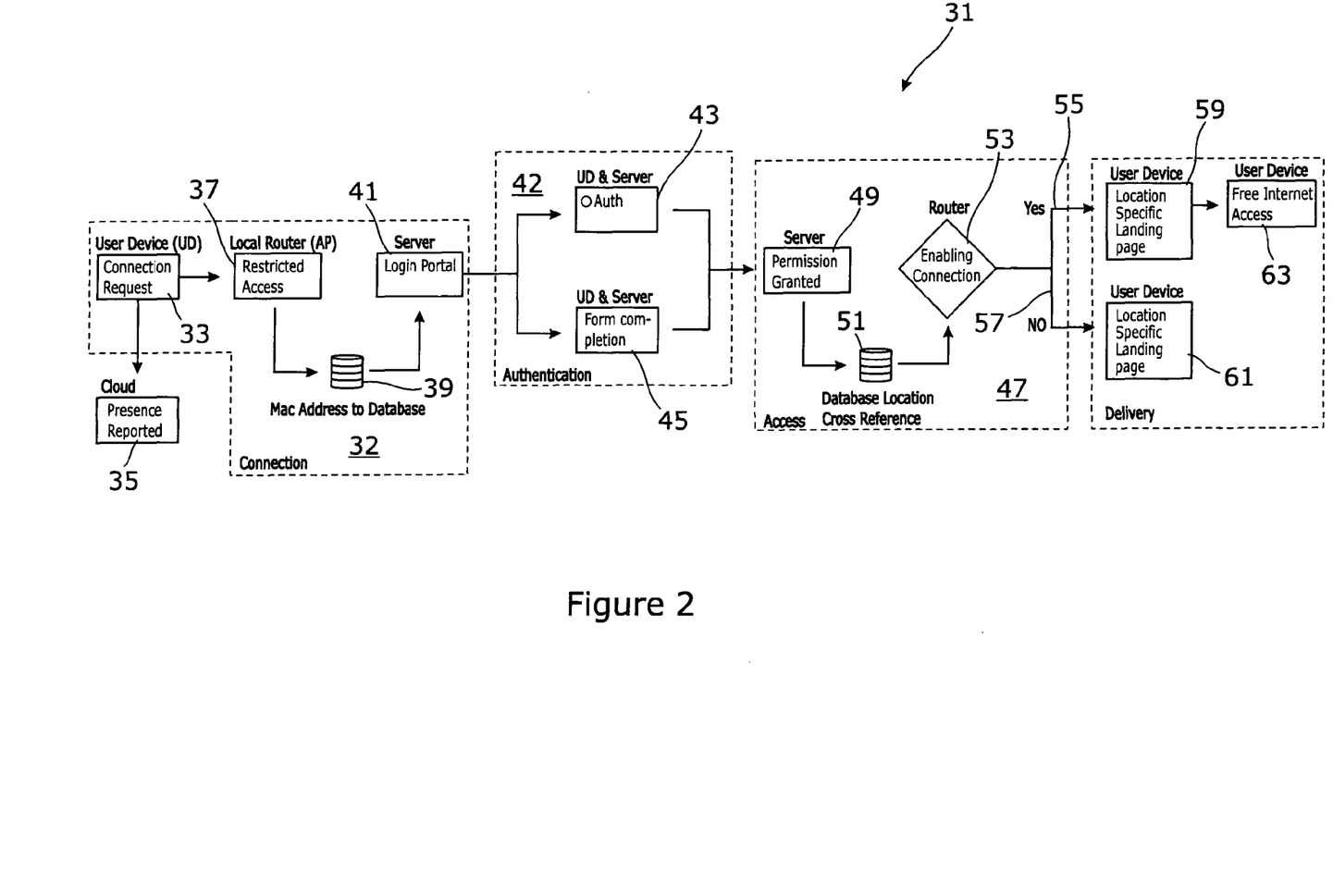
FIG. 2 is a flow diagram which shows the process of registration and use of a system in accordance with the present invention.

FIG. 2 is a flow diagram 31 which shows the process of registration and use of a system in accordance with the present invention. In this embodiment of the present invention, the system and method of the present invention are used to create a network which provides a range of services and information to visitors to a location such as a town or city where the user has a need for a reliable source of information pertaining to the services and activities which the city has to offer.

In this example, the network of the present invention may be adopted as a "City Hub". This terminology is used to convey the fact that the network may be run by or on behalf of a City tourist board, merchants' organization or the like. Vendors such as local restaurateurs, café owner, shops bars and the like can join the network. Membership of the network requires that they provide Wi-Fi access within their premises and possibly adjacent to it. The vendor also provides access to a landing page on their website via the Wi-Fi access point. Local information relating to, businesses, events and deals or offers which are available in the local area are also provided to the device.

In this example of the invention, connection to the City Hub by a person's mobile computing device may be initiated when the person arrives in the city at, for example an Airport or train station as follows.

The person arrives in to the city and, as is common, searches for a Wi-Fi hotspot in order to obtain internet access.

1. They search for a Wi-Fi network in the station, cafe or shopping mall that they have arrived in. Among the options available is 'Free City Hub'.

2. The person chooses to register/connect 32 with the City Hub by using their mobile computing device (User Device or UD) to make a connection request 33. The UD's presence is reported 33 to the server side and in this example, is stored in a server side database which may be provided by a cloud computing service. The UDs presence is also detected by the closest wireless internet access point which in this example is a wireless router 37. The MAC address of the UD is stored in a database 39.

3. Authentication 42 commences when a login page is loaded onto the UD and the user is asked to sign up for free Wi-Fi by signing in through one of their social media logins for example Facebook™, Twitter™, Google+™ or Linkedin™. This step requires communication from the City Hub server to the user's device and to the social media database using the OAuth™. Authorization open standard. The UD is provided with an alternative means for logging in which requires the user to submit a form 45 containing the relevant details, typically a username and password.

4. The process of obtaining internet access 47 commences when the user information is correctly provided to the server and permission is granted 49. This data is cross referenced with data which confirms the vendor location 51. The router then enables connection of the UD to either the landing page only 61 or the landing page 59 and internet 63. The content of the landing page is dependent upon the identity of the vendor who owns the closest wireless internet access point.

If the user is accessing the City Hub in the high street, through an access point that is owned by the local authority, they are landed into a page that is populated with content from within a set distance of their immediate location. This could be about participating businesses within a certain distance from the access point and any other information as determined by the local authority. Once a member of the City Hub network the user can move through the city from one wireless internet access point to another without need to re log in or authenticate. The user will be taken to the web site landing page of a network participating vendor which has a wireless internet access point which is in the closest proximity to the user.

Figure 3A:
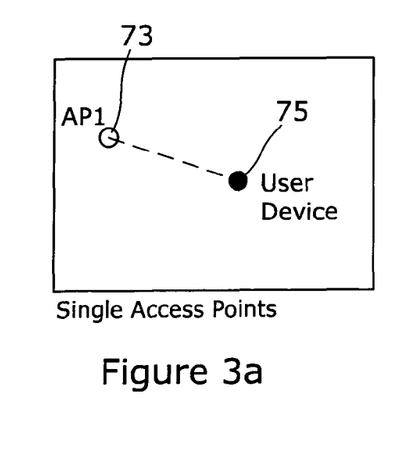
FIG. 3a illustrates a situation where a user device may access the network via a single wireless internet access point and FIG. 3b shows the process of accessing the internet via the wireless internet access point.
Figure 3B:
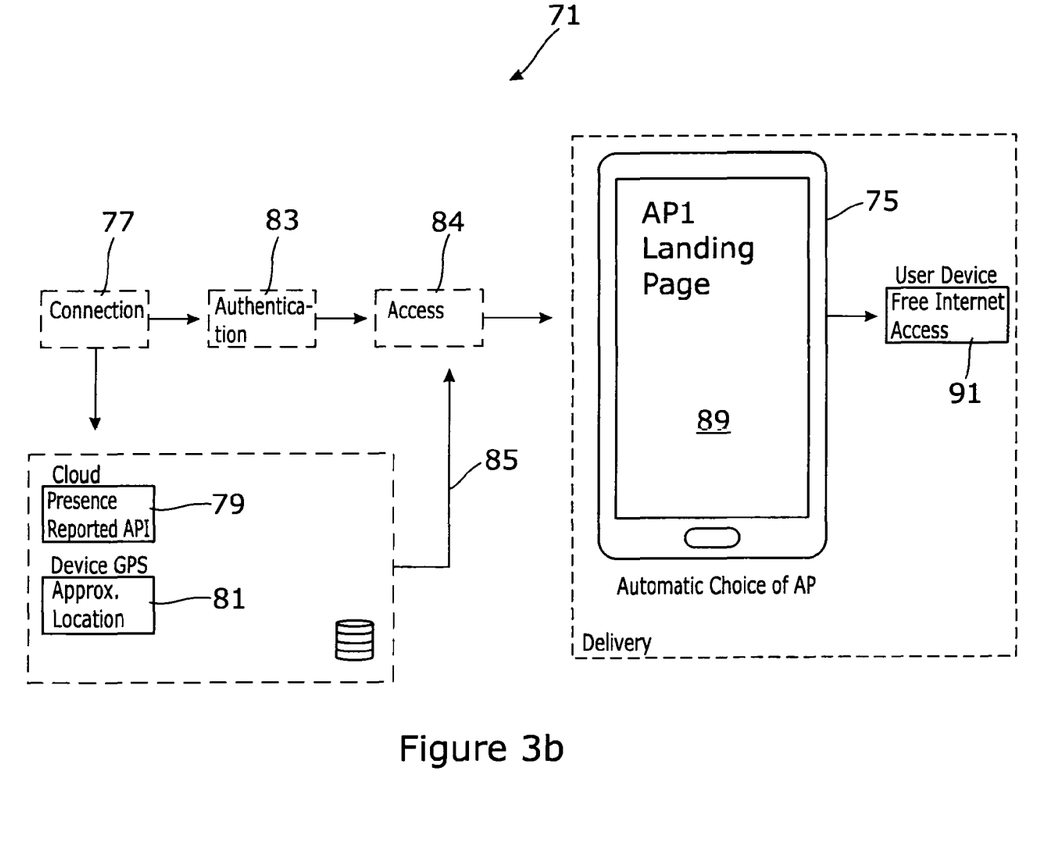

FIG. 3a shows a UD 75 at a distance from wireless internet access point AP1 73. FIG. 3b shows the process of accessing the internet via the wireless internet access point. Where the user enters a vendor's premises, their UD 75 requests connection with the wireless internet access point AP1 73. Connection 77 allows restricted access to the login portal, at which time the authentication process 83 cross checks the AP1 73 MAC address against a database.

The cross check gives the accurate location coordinates for AP1. At this time UD's presence is reported to the server 79 and the US's GPS location is passed to the server 81 to further improve the accuracy of the user's estimated location. In this way the user is 'landed' in the 'virtual shop front' of the vendor that owns or runs the access point (for instance a small coffee shop in the high street). Once access 84 is granted, a landing page 89 is loaded on to the UD 75 which provides the vendor with an opportunity to advertise its wares, sell products online and promote events and services all under the trusted umbrella of the city hub.

The system of the present invention operates with a number of separate and distinct vendors and the UD will move from being closer to a first AP to being closer to a second AP. In this example of the present invention, when a UD moves from being closes to one AP to another a UD's session is interrupted and redirected to the landing page which is accessed by the closest wireless internet access point. In this way if a user moves from cafe 1 to shop 2 while using the free Internet they will have to first digest the landing page of both businesses on their way. In other examples of the present invention, seemless wifi access is provided without interruption but, when the UD moves towards another AP, an event is triggered on the UD which alerts the User to the fact that his UD is approaching or is in the premises of a vendor which is a member of the City Hub system.

As the user moves from one access point to another, their UD is leaving a data trail which is retained and recorded by the City Hub system and the journeys are made available to the city and participating businesses (on a limited basis) to track the movements of foot traffic through the high street, enabling complex and advantageous analytical reporting for town and local business.

The presence of a user mobile computing device is reported by the wireless internet access points to the system continuously. Proximity of a device to the wireless internet access point may be determined by wireless signal strength or other parameters. For example, a geofence may be defined around an area such as the boundary of a vendor's premises and/or the change in relative signal strength can be used to determine the correct access point where more than one such access point is in range. In cases where there is more than one wireless internet access point present, the signal strength of both devices is used to determine the relative proximity of the user's device and the routers. The server collects the reports of presence reporting from the server and when the status of closest router changes will redirect the user's device to the relevant landing page for the new access point.

Advantageously, the data associated with a user provides a predictive model of user behaviour built up over time for a user. The predictive model is dependent upon the movement of the user device and its interaction with the system and is independent of the personal information provided by the user when registering to use the system. It is a further advantage that the privacy of the individual user is maintained by avoiding the need to reference the movement of the user device with respect to a social media profile or other detailed personal information. In this example of the present invention, the model is created without reference to the age, gender or other user information but only with reference to the activities associated with the user device.

The present invention has a number of technical advantages with respect to the state of the art which will be described below.

Successful Delivery of User to the Correct Landing Page

One purpose of the present invention is to provide a way of maximizing exposure of each individual vendor who participates in the Network by changing the content that is experienced by a user depending upon the access point which is used. Standard router configurations are set up to ensure continuity of coverage so that a user will not notice that they have moved from a first Internet access point to another. In other words, networks, often used in citywide or venue-wide solutions, are designed to optimize the experience of the user and to ensure a seamless transition from one access point to another.

In the case of the present, there is an over-riding technical and commercial requirement to ensure that the UD moves from the landing page of a first vendor to that of a subsequent vendor. The reason is that, each vendor expects that their membership of the City Hub system will allow them to present hyperlocal advertisments to potential customers who are in proximity to their premises. Accordingly, in all cases, being directed to a landing page is dependent upon the proximity of the UD to the vendor's premises. In one embodiment of the present invention, the presentation of a specific vendor landing page to a UD is achieved by introducing an interrupt to the network coverage so that the user is compelled to view the landing page of a first vendor using a first wireless internet access point and then a second vendor with a corresponding second internet access point. Interruption of the network coverage provides a technical solution which runs contrary to established practice so that the user is compelled to view the landing page of a first vendor using a first wireless internet access point and then a second vendor with a corresponding second internet access point.

In another embodiment of the present invention, seamless internet access is maintained when a UD moves from proximity to a first AP to a subsequent AP. IN this example of the invention, the difference between receiving internet access from the first AP and a subsequent AP is detected by the system and an event is triggered on the UD such that the UD is then presented with information associated with the subsequent AP so that their hyperlocal advertisements are presented to the UD.

Figure 4:
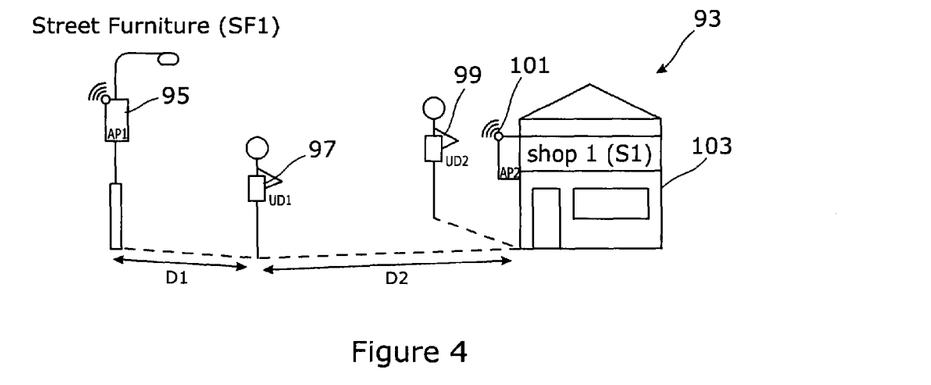
FIG. 4 is a schematic diagram which shows a situation where multiple user devices may access the network via a public one wireless internet access point or a vendor wireless internet access point.

FIG. 4 shows part of a network 93 in accordance with the present invention where AP1 95 is situated on a lamp post and AP2 101 is situated on the premises of shop 1 103103 which is a member of the network. User devices UD1 97 and UD2 99 are located at different distances D1 98 and D2 100 with respect to AP1 95 and AP2 101. UD2 99 is accessing the Internet from the only available access point AP2 101, and upon arrival there is served to the landing page for Shop 1 103 after OAuth is completed.

At the location of UD1 97 where the fields of both AP1 95 and AP2 101 overlap, UD1 is closer to AP1 than AP2 D1 98 being shorter than D2 100. Triangulation technology is used to determined that UD 1 97 should be delivered into the landing page for AP1 95 rather than AP2 101.

Disparity Between Absolute Position and Venue Landing Page

Figure 5:
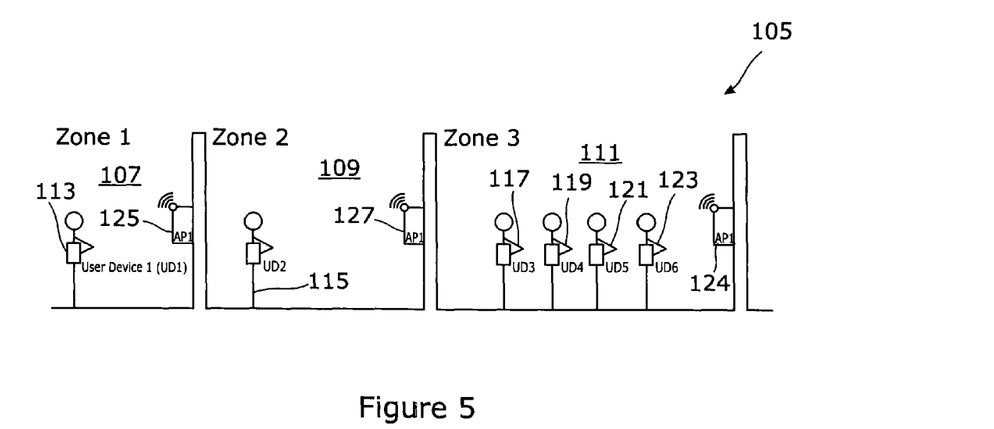
FIG. 5 is a schematic diagram which shows a situation where multiple user devices may access the network via more than one vendor wireless internet access point.

FIG. 5 is a schematic diagram 105 which shows a situation where multiple user devices may access the network via more than one vendor wireless internet access point.

In FIG. 5 three adjacent Wi-Fi zones 107, 109 and 111 are shown. Zone 107 contains UD1 113 and AP1 125, Zone 109 contains UD2 115 and AP2 127 and zone 111 contains UD3 117, UD4 119, UD5 121 and UD6 123 to UD contain These zones represent vendors who are members of a network in accordance with the present invention.

UD2 115 is situated in Zone 2, but is closer in distance to AP1 125 than it is to AP2 127 despite being in the vendor premises of AP2 127. Similarly UD3 117 and UD4 119 are closer in distance to AP2 127 than they are to AP3 129 despite being in the vendor premises of AP3 129.

Figure 6A:
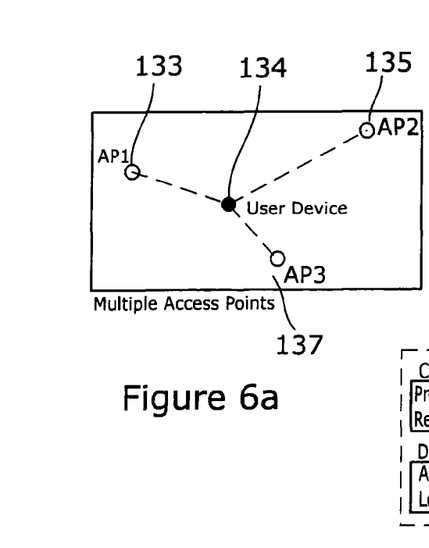
FIG. 6a shows a plurality of wireless internet access points in proximity to a user device and FIG. 6b is a flow diagram which illustrates one way of identifying and selecting a wireless internet access point in accordance with the present invention.
Figure 6B:
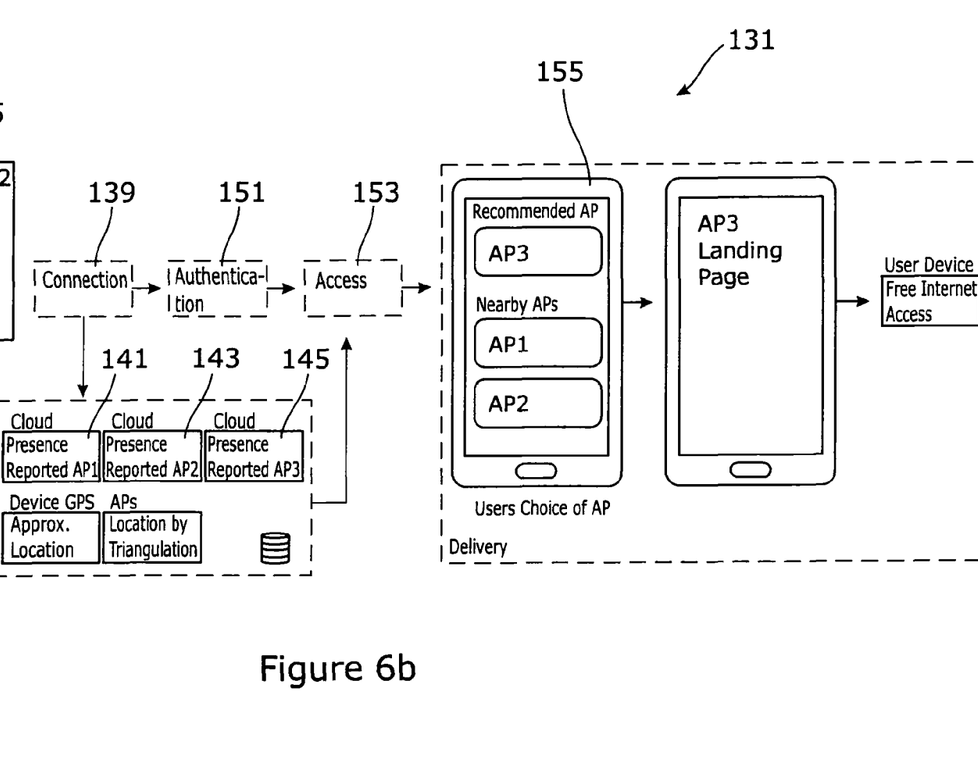

This process is explained in more detail with respect to FIG. 6a which shows a plurality of wireless internet access points in proximity to a user device and FIG. 6b, a flow diagram illustrates one way of identifying and selecting a wireless internet access point in accordance with the present invention. FIG. 6a shows AP1 133, AP2 135 and AP3 137 at different distances from UD1 134.

In order to ensure that the UDs are connected via the APs of the vendors in whose premises they are located, during the connection phase 139, upon connection request from a UD, the local APs will make a presence report event to the cloud 141, 143 and 145. The UDs 134 GPS data and the APs' 133, 135 and 137 triangulation data are used to trigger an event which in this example is the display of a choice of several Aps which are all in proximity to the UD. In this example of the present invention, A recommendation is provided to the UD as to which of the APs should be used as the preferred or recommended AP 155. The user may select from any of AP1 133, AP2 135 or AP3 137.

In the more complex case shown in FIG. 5 all of the UDs are presence reported to the cloud by all of the AP that are within range and therefore with triangulation, coupled with the GPS data from the device, the server can make a reasonable estimate of UD location and triggers an event on the UD which offers the user a choice of the local APs. The user's expected behaviour is to choose the AP that is equivalent to their physical location in a vendor's premises.

Figure 7:
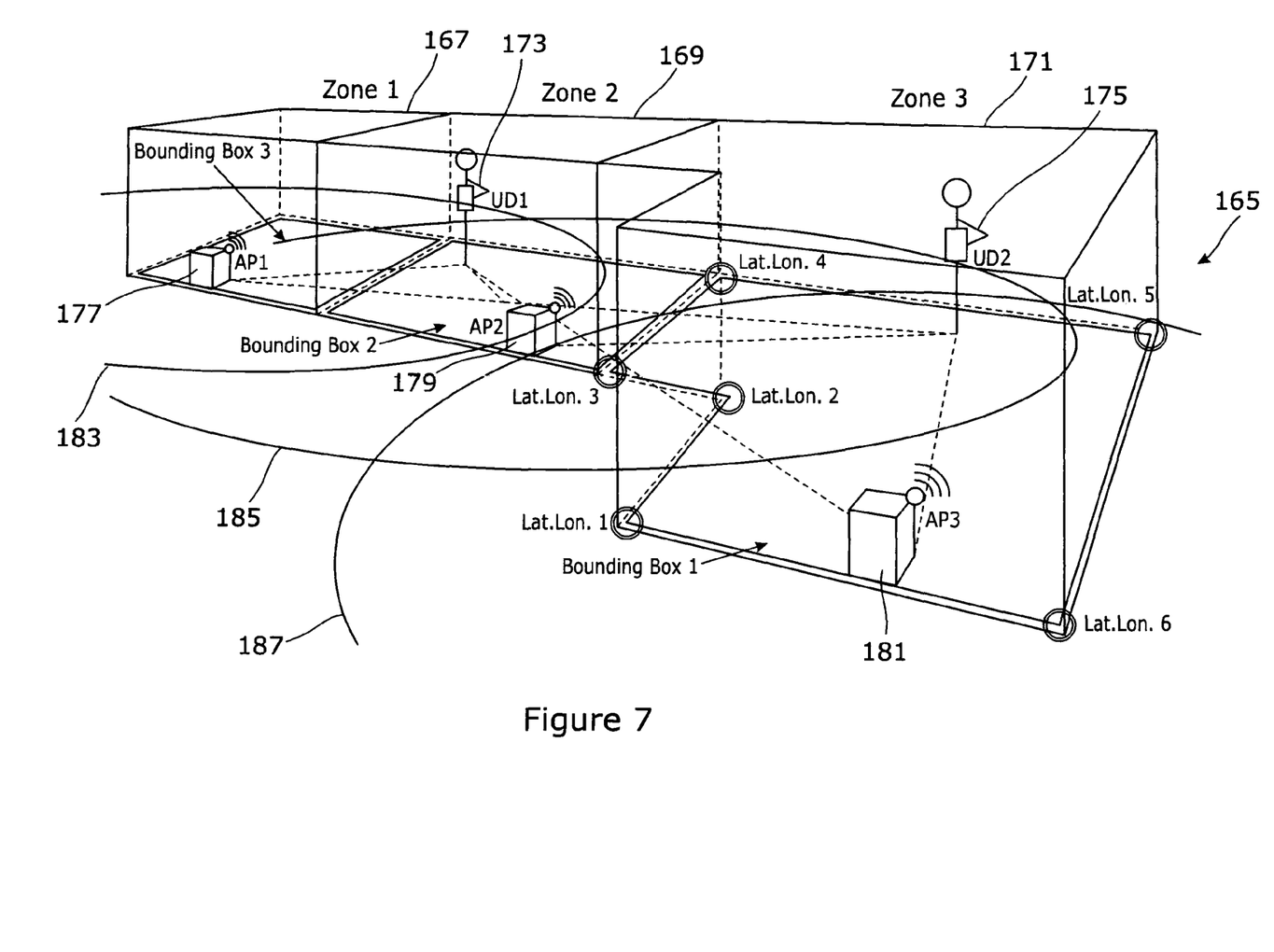
FIG. 7 shows the signal overlap associated with a plurality of wireless internet access points in proximity to user devices.

FIG. 7 shows the signal overlap associated with a plurality of wireless internet access points in proximity to user devices. The network 165 comprises zones 1 167, zone 2 169 and zone 3 171 which contain AP1 177, AP2 179 and AP3 181 respectively. UD1 173 is situated in zone 2 169 and UD2 is in zone 3 171. In order to further ensure that a UD gains access to the internet via the AP which is within the zone in which they are located a boundary or geofence is defined within which the AP will be sent to a specified AP if it is within the boundary. This may be done using latitude and longitude coordinates delivered to the server.

UD1 173 and UD2 175 can be accurately triangulated using the relative signal strength of nearby APs. With the AP locations known, their locations having been logged when the system is set up, a very accurate location can be determined of the UD. The server can then determine which bounding box the UD falls within and direct the user's device to the correct landing page for that UD location.

The vendor who participates in a network in accordance with the present invention may have a need to use a mobile device to post new content any time of day, irrespective of their location. If the vendor creates a post targeted to the landing page of their business, and they complete this action from their mobile device; ordinarily the geo-location for that post will default to the UD location (which could be anywhere but inside the business premises). The result would be posts for the Vendors premises which looked like it came from a third party location (bus, train, home etc) rather than from the vendor's premises.

The present invention further provides for the geo-location data of any post created for the landing page of a local business, to be hard wired to default to the known location of the vendor's premises. In this way when a network user is accessing the Wi-Fi from a municipal AP they will be delivered correctly geo-located content from the Ivendor Advertising on mainstream solutions such as billboards is the preserve of large companies with big budgets. Local advertising media such as magazines, papers, and directories is in sharp decline. Small to medium sized business in city centres are rarely able to advertise effectively because of the greater presence of advertisements by large corporate chains and brands.

The network of the present invention provides a software interface for an advertising booking portal which enables small to medium sized businesses to advertise on the network landing pages in their surrounding area. The advertising is hyper localised by their account, which is inextricably linked to their APs location. In this way a local business can ensure their advertising spend is highly targeted and measured in terms of exact impression rates.

In the process of accessing the internet via the system in accordance with the present inventory, it is desirable to provide the user with access as quickly as possible and in a seamless manner. However, it is also recognised that the provision of internet access is dependent upon the absence of hardware and software errors in a number of devices which form part of the communication link between a user device and the internet.

Figure 8:
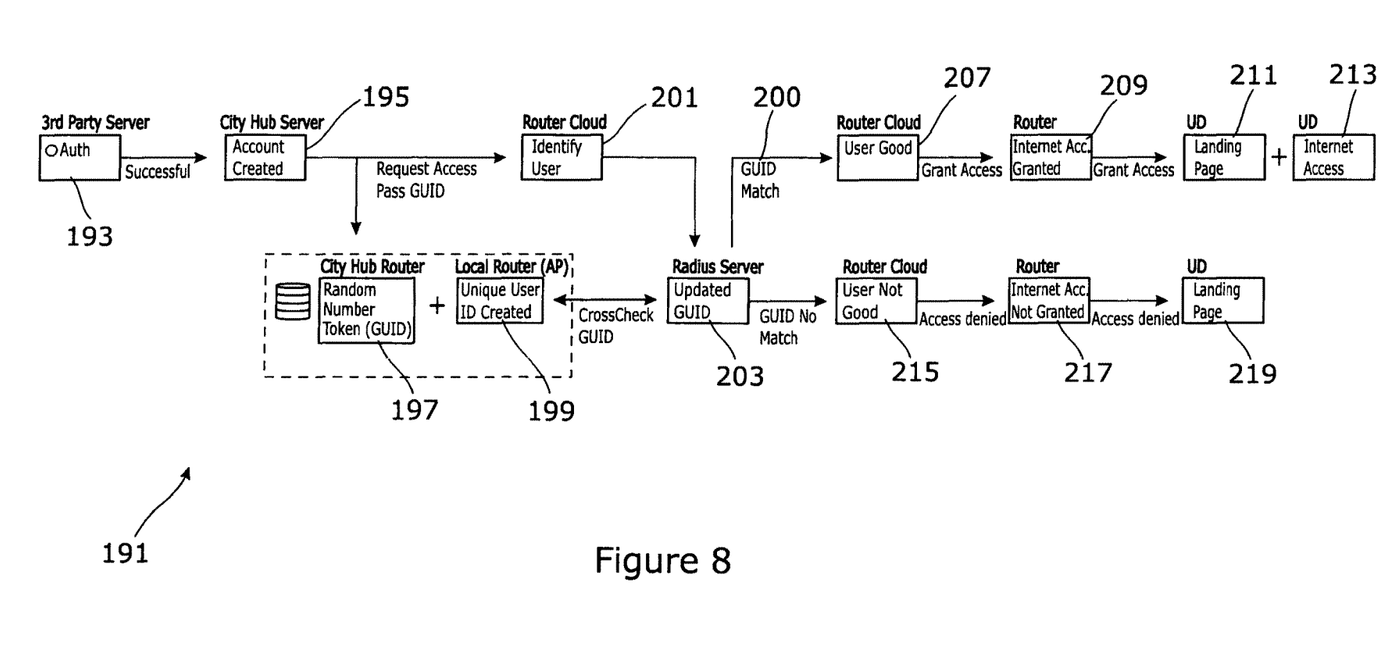
FIG. 8 is a flow diagram which shows a process for using OAuth and creating a social media profile.

FIG. 8 shows an example of how a link between a user device and the internet is provided. One advantage of this approach is that, where third party software and/or hardware errors cause internet access to fail, the user device is provided with a holding page in lieu of full internet access. The process by which internet access is provided to a user device by a system in accordance with the present invention is shown in FIG. 8.

Upon successful registration using OAuth or providing a username and password, an account is created for the user device at a system server 195. The system server creates a global unique identifier code (GUID) for the user device which is sent to a first location and to a second location. In this example of the invention, the GUID is firstly sent to the System Router located in the vendor's premises and also to a router cloud 201. In the first case, the GUID may also be combined with a Unique identifier generated at the Vendor Router 199. Both the router cloud 201 and the City Hub router 197/local router 199 are connected to a Remote Authentication Dial in user service (RADIUS) server 205. The RADIUS server 205 compares the versions of the GUID received from the City Hub Router 197 and Vendor Reuter 199 where the GUID's match, the process of granting full internet access is continued via the router cloud 207 which grants access to the internet at the router 209 which first presents the user device with a landing page 211 then full internet access 211.

Where the GUID's do not match, this is an indication of a software or hardware issue, the information that the GUID's do not match is given to the Router cloud 215 and the access to the internet is denied at the Router 217. However the user device is granted access to the landing page from the City Hub Router. This may be used to provide holding information until the issue is remedied.

The benefits of this solution are that even if the whole process of the Wi-Fi bridge fails the username and password or OAuth registration process creates a new account on the proprietary social media network and the process can be restarted or queued and all under the control of the server instead of the Router Cloud.

Improvements and modifications may be incorporated herein without deviating from the scope of the invention.

The invention claimed is:

1. A network system for providing content to a mobile computing device of a user based upon the location of the mobile computing device, the system comprising a server having:
   a user database for storing personal information about a plurality of users;
   a mobile computing device database for storing information which identifies the device and the device location;
   a vendor database which stores information on each of the vendors within the network; and
   a vendor web site which contains a landing page;
   one or more wireless internet access points connected to the server via a communication link
   wherein each of the wireless internet access points provides access to a vendor web site via a wireless signal such that upon connecting the wireless internet access points to the user's mobile computing device, a processor determines whether the device is associated with a user and if so, said device is directed to the landing page of the vendor web site when the user mobile computing device's device location is within a predetermined proximity to the wireless internet access point of that vendor;
   wherein, when a user mobile computing device moves from a location in proximity to a first wireless internet access point to a location in proximity to a second wireless internet access point, where the wireless signals from the first wireless internet access point and from the second wireless internet access point are both detectable by the mobile computing device, the mobile computing device's internet session provided via the first wireless internet access point is interrupted and redirected to the second wireless internet access point for providing a new internet session via that vendor's landing page; and
   wherein the wireless signal strength of the wireless internet access points is used to detect the presence of wireless internet access points in proximity to the mobile computing device and the display of the mobile computing device is presented with information to allow a user to select an appropriate landing page, the landing pages ranked in accordance with relative wireless signal strengths from their respective wireless internet access points.

2. A network system as claimed in claim 1 wherein, the step of directing the mobile computing device to the landing page comprises triggering an event on the mobile computing device which informs the user that they are within the predetermined proximity to the wireless internet access point and presents the mobile computing device with access to the landing page of the vendor website.

3. A network system as claimed in claim 1 wherein, the step of directing the mobile computing device to the landing page comprises triggering an event on the mobile computing device which informs the user that they are within the predetermined proximity to the wireless internet access point and presents the mobile computing device with access to the landing page, a plurality of vendor websites and/or other sources of local content.

4. A Network System as claimed in claim 1 wherein, relative wireless signal strength of the first wireless internet access point and the second wireless internet access point, is used to determine the relative proximity of the mobile computing device to the first wireless internet access point and the second wireless internet access point and to determine which wireless internet access point should provide internet access.

5. A Network System as claimed in claim 1 wherein, the wireless internet access point is provided with a geofence which further defines the area within which it is to provide internet access to a mobile computing device.

6. A Network System as claimed in claim 1 wherein, the Network comprises a plurality of vendors in a geographical location.

7. A Network System as claimed claim 1 wherein, the network defines a location where specific information is to be displayed on a landing page at a predetermined geographical location via the wireless internet access point provided at the geographical locations.

8. A Network System as claimed in claim 1 wherein, the vendors comprise a plurality of shops, hotels and other commercial premises located in a geographical location such as a city.

9. A Network System as claimed in claim 1 wherein, the vendors comprise a series of information points at a museum or other tourist attraction.

10. A Network System as claimed in claim 1 wherein, the wireless network is a Wi-Fi network.

11. A Network System as claimed in claim 1 wherein, data relating to a user is provided to the user database from the user's existing social media profile.

12. A Network System as claimed in claim 1 wherein, the user database comprises a user profile.

13. A Network System as claimed in claim 1 wherein, a globally unique identifier and a Unique User ID is created and stored in the user database.

14. A Network System as claimed in claim 1 wherein, a connection between a mobile computing device and a wireless internet access point in the network is recorded in the user device database.

15. A Network System as claimed in claim 1 wherein, a MAC address of the wireless internet access points is stored in the vendor database this provides accurate location coordinates for the wireless internet access point.

16. A Network System as claimed in claim 15 wherein, the MAC address location is cross checked with the mobile computing device GPS location to further determine whether the mobile computing device is in proximity to the wireless internet access point.

17. A Network System as claimed in claim 1 wherein, the vendor database stores information on the physical location of the wireless internet access points.

18. A Network System as claimed in claim 1 wherein, the vendor web page is stored on a central server.

19. A Network System as claimed in claim 1 wherein, the vendor web page is provided with an authoring tool which allows an author to post updates to the web page which is linked to the location of the wireless internet access point and associated web page.

20. A Network System as claimed in claim 15 wherein, the MAC address of the wireless internet access points is stored in the vendor database this provides accurate location coordinates for the wireless internet access point.

21. A Network System as claimed in claim 15 wherein, the physical location of the mobile computing device is detected relative to the wireless internet access points in the network to provide information on the movement of the mobile computing device in the network.

* * * * *